United States Patent
Zai et al.

(10) Patent No.: US 12,155,275 B2
(45) Date of Patent: Nov. 26, 2024

(54) SWITCHING DEVICE FOR AN ELECTRIC MOTOR AND AN ELECTRIC MOTOR COMPRISING SAID SWITCHING DEVICE

(71) Applicants: ELDOR CORPORATION S.P.A., Orsenigo (IT); TECNOMATIC S.P.A., Pescara (IT)

(72) Inventors: Luca Zai, Turin (IT); Ruggero Seccia, Turin (IT); Javier Eduardo Pereira Rivas, Turin (IT); Pasquale Forte, Castiglione d'Orcia (IT); Michele Roman, Noventa di Piave (IT)

(73) Assignees: ELDOR CORPORATION S.P.A., Orsenigo (IT); TECNOMATIC S.P.A., Pescara (IT)

( * ) Notice: Subject to any disclaimer, the term of this patent is extended or adjusted under 35 U.S.C. 154(b) by 433 days.

(21) Appl. No.: 17/442,863

(22) PCT Filed: Mar. 26, 2020

(86) PCT No.: PCT/IB2020/052860
§ 371 (c)(1),
(2) Date: Sep. 24, 2021

(87) PCT Pub. No.: WO2020/194230
PCT Pub. Date: Oct. 1, 2020

(65) Prior Publication Data
US 2022/0190691 A1 Jun. 16, 2022

(30) Foreign Application Priority Data

Mar. 28, 2019 (IT) .......................... 102019000004667
Jul. 12, 2019 (IT) .......................... 102019000011655

(51) Int. Cl.
*H02K 11/28* (2016.01)
*H02K 3/50* (2006.01)

(52) U.S. Cl.
CPC ............... *H02K 11/28* (2016.01); *H02K 3/50* (2013.01); *H02K 2203/09* (2013.01)

(58) Field of Classification Search
CPC ...... H02K 11/28; H02K 3/50; H02K 2203/09; H02K 11/20; H02K 3/28; H02K 2213/09
(Continued)

(56) References Cited

U.S. PATENT DOCUMENTS

| 5,821,660 | A | * | 10/1998 | Anderson | ................. | H02K 3/28 |
| | | | | | | 318/400.11 |
| 2002/0105301 | A1 | * | 8/2002 | Bush | ....................... | H02P 25/04 |
| | | | | | | 318/771 |
| 2007/0210733 | A1 | * | 9/2007 | Du | ......................... | H02K 1/278 |
| | | | | | | 318/268 |

FOREIGN PATENT DOCUMENTS

| CN | 101320923 | A | 12/2008 |
| CN | 101320923 | * | 10/2010 |

(Continued)

OTHER PUBLICATIONS

International Search Report and Written Opinion dated May 18, 2020 from counterpart International Patent Application No. PCT/IB2020/052860.

*Primary Examiner* — Ahmed Elnakib
(74) *Attorney, Agent, or Firm* — SHUTTLEWORTH & INGERSOLL, PLC; Timothy J. Klima

(57) ABSTRACT

A switching device for an electric motor provided with a plurality of phases includes a fixed body equipped with a plurality of connection portions and at least one moveable body that can be moved with respect to the fixed body between at least a first position, in which the phases are arranged in a first electrical configuration, and a second position, in which the phases are arranged in a second electrical configuration. The second electrical configuration is separate from the first one due to the connection between (Continued)

the phase fractions within each phase and/or due to the reciprocal connection between the phases.

16 Claims, 14 Drawing Sheets

(58) Field of Classification Search
USPC .......................................................... 310/71
See application file for complete search history.

(56) References Cited

FOREIGN PATENT DOCUMENTS

| | | | |
|---|---|---|---|
| EP | 3435540 | * | 1/2019 |
| EP | 3435540 | A1 | 1/2019 |
| WO | 2015138766 | A1 | 9/2015 |

* cited by examiner

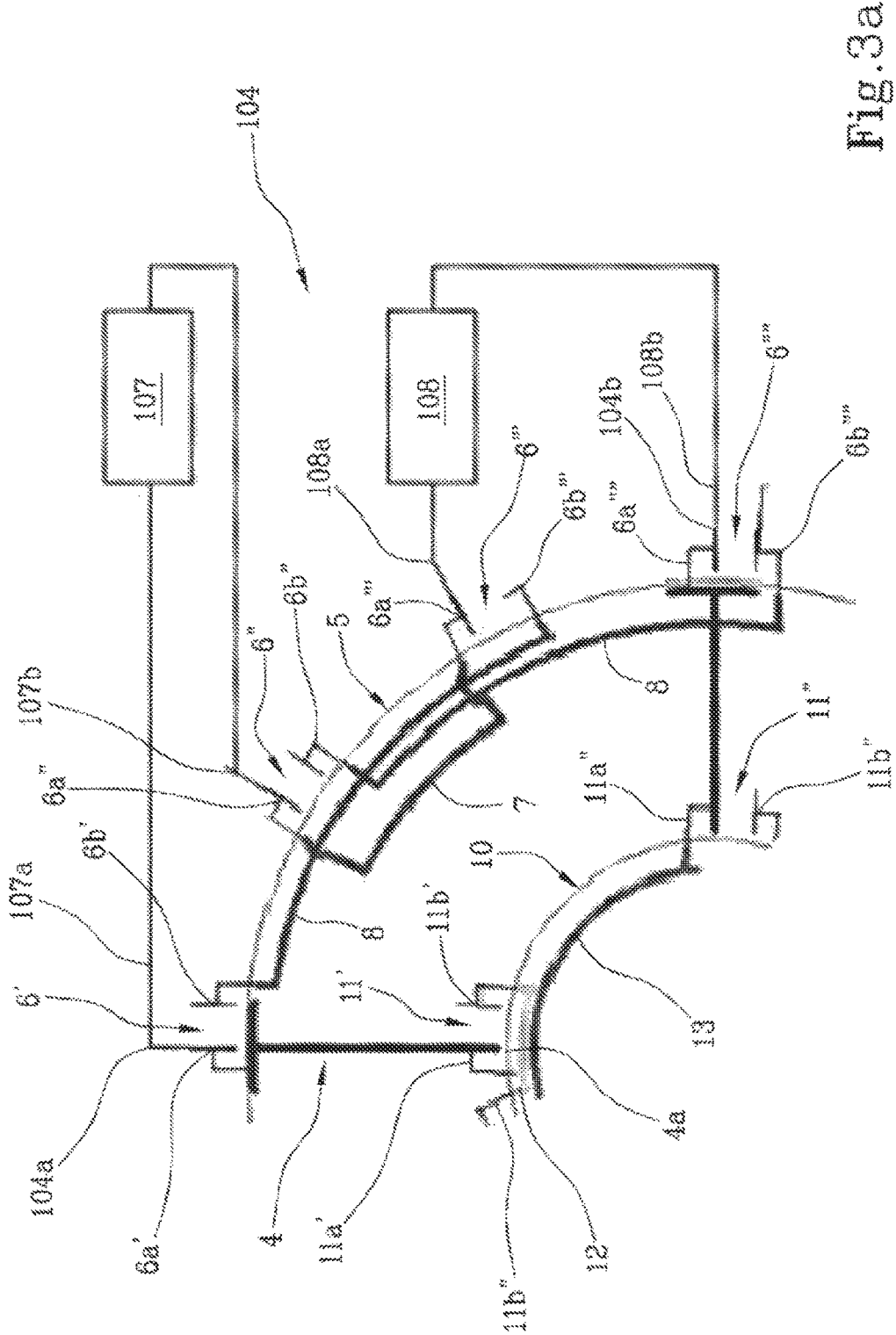

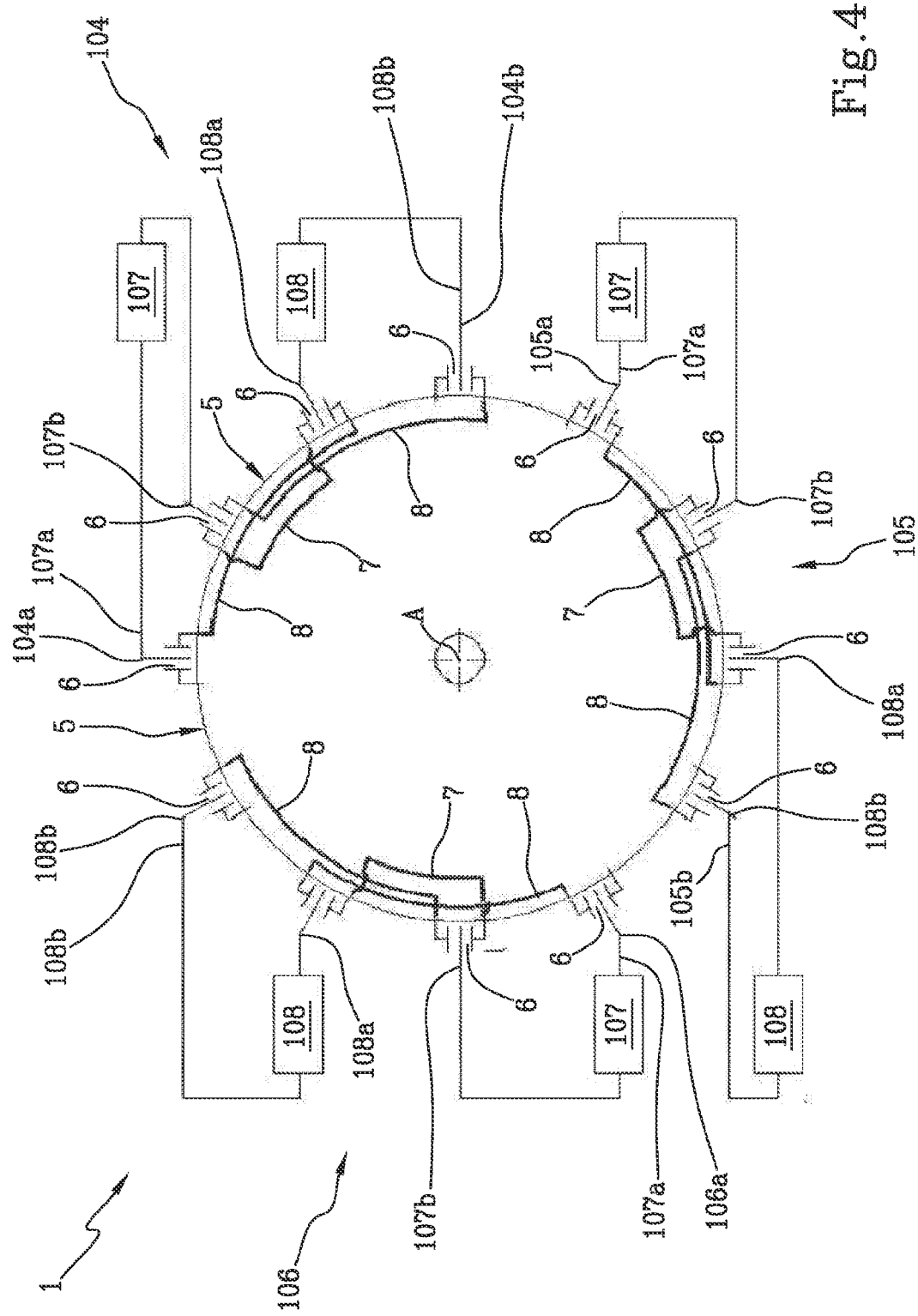

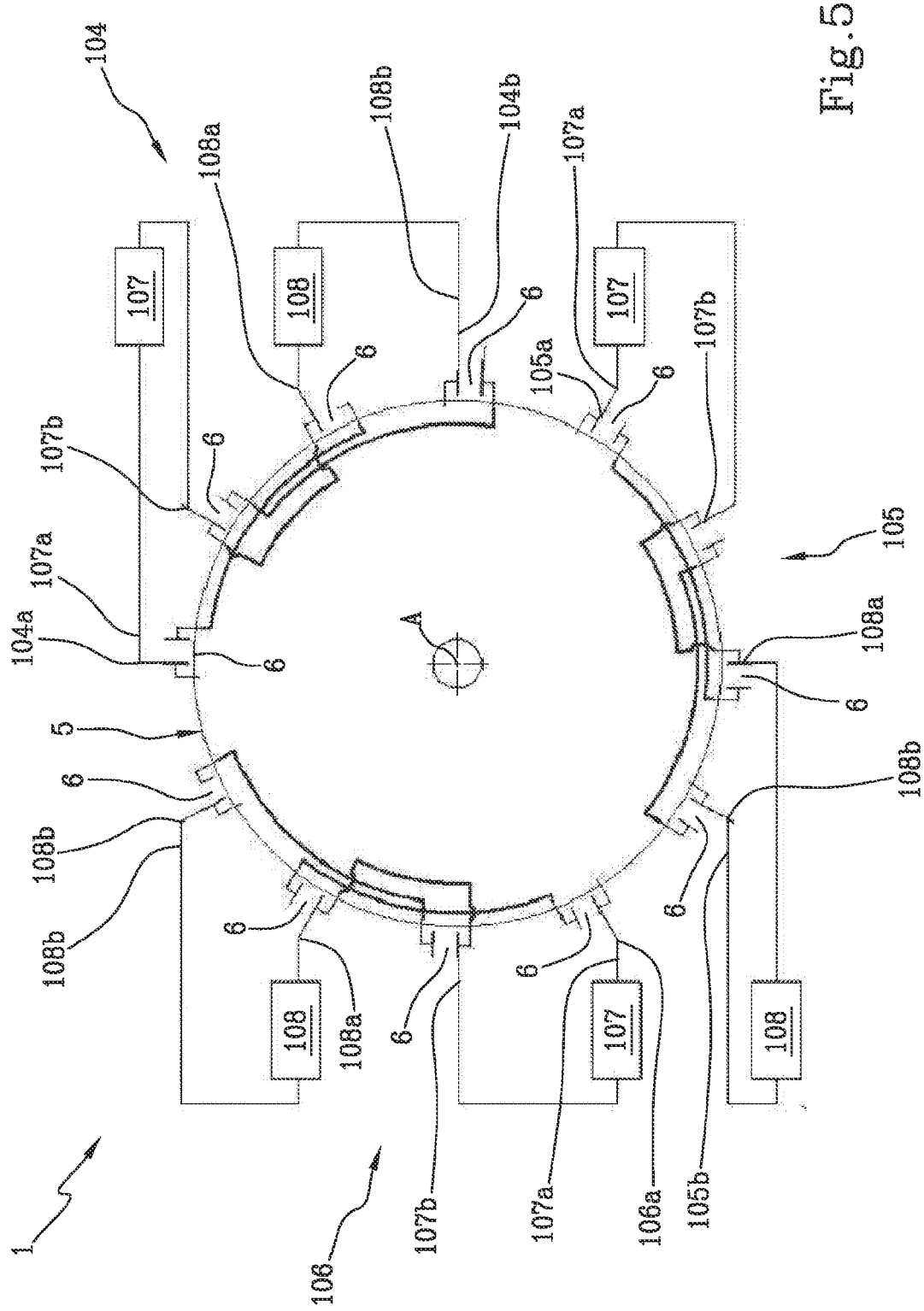

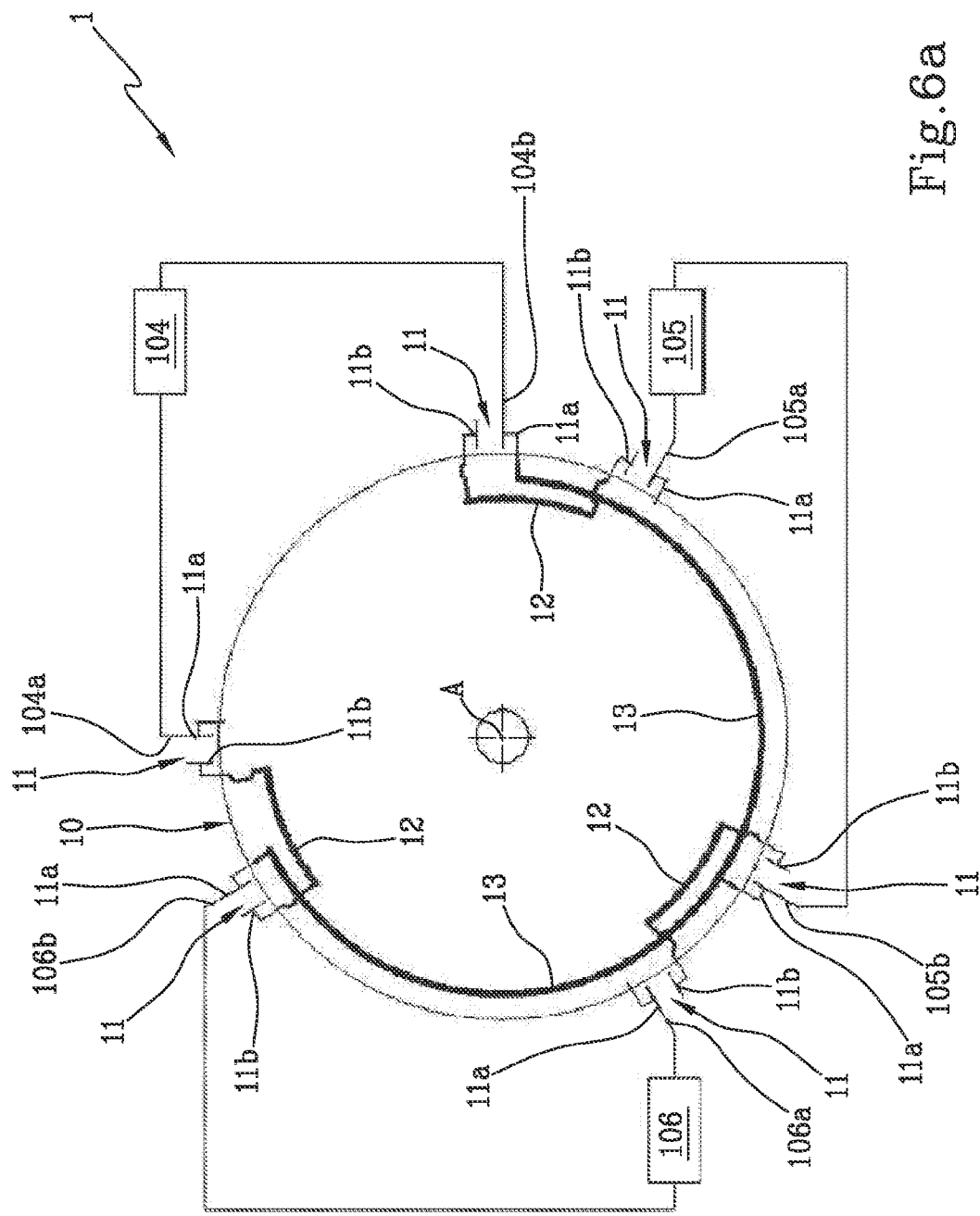

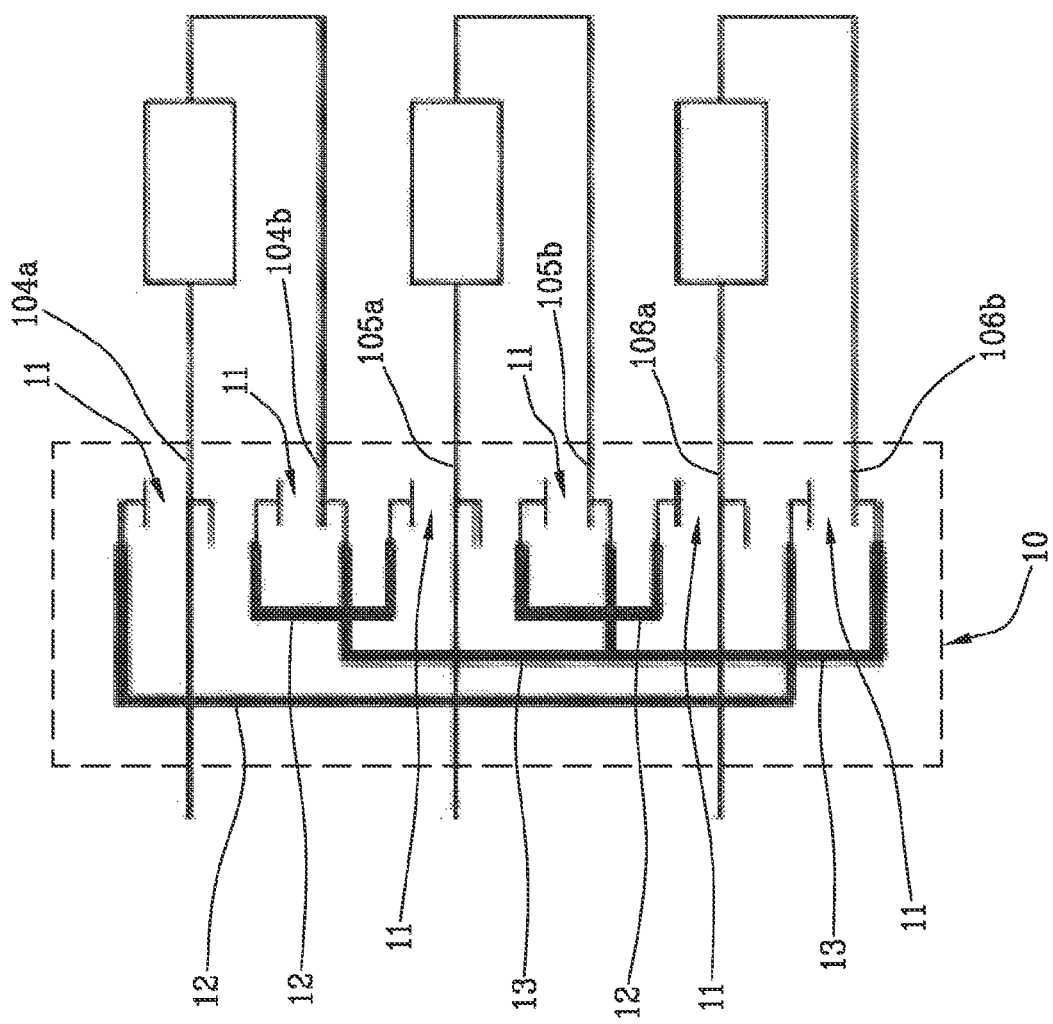

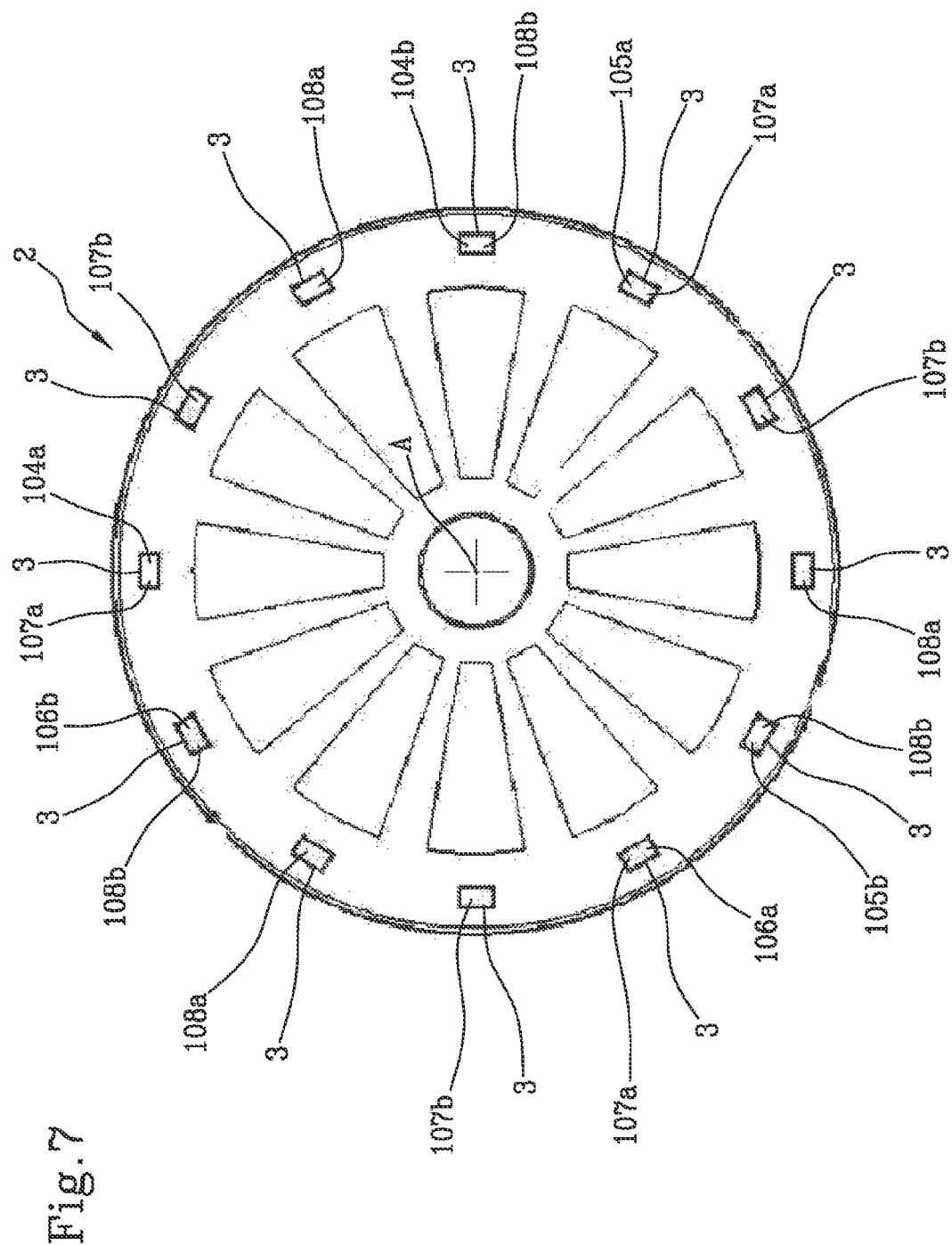

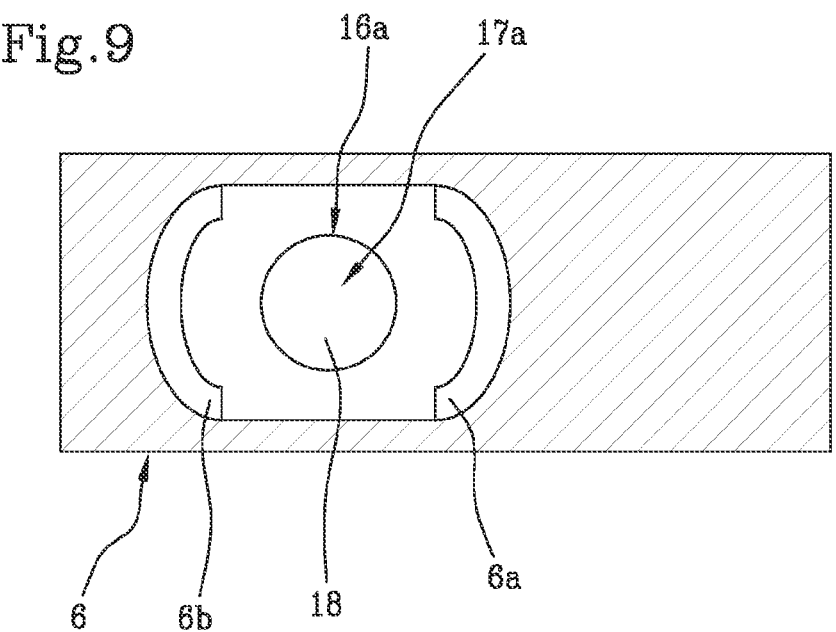
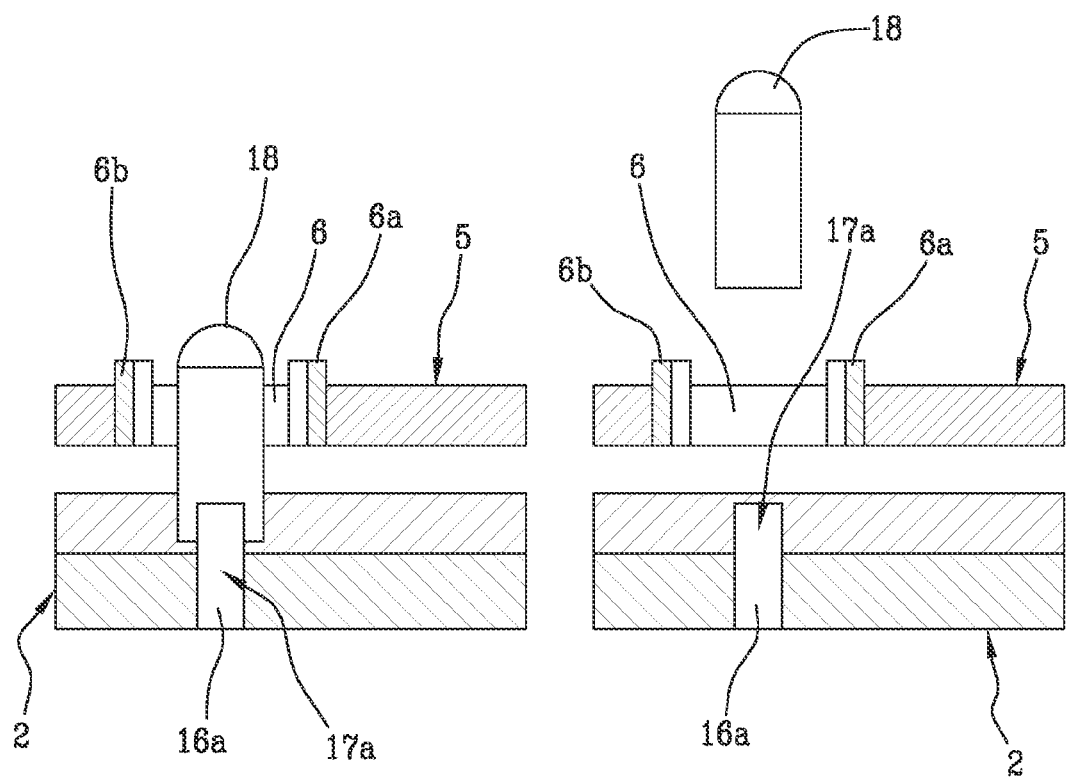

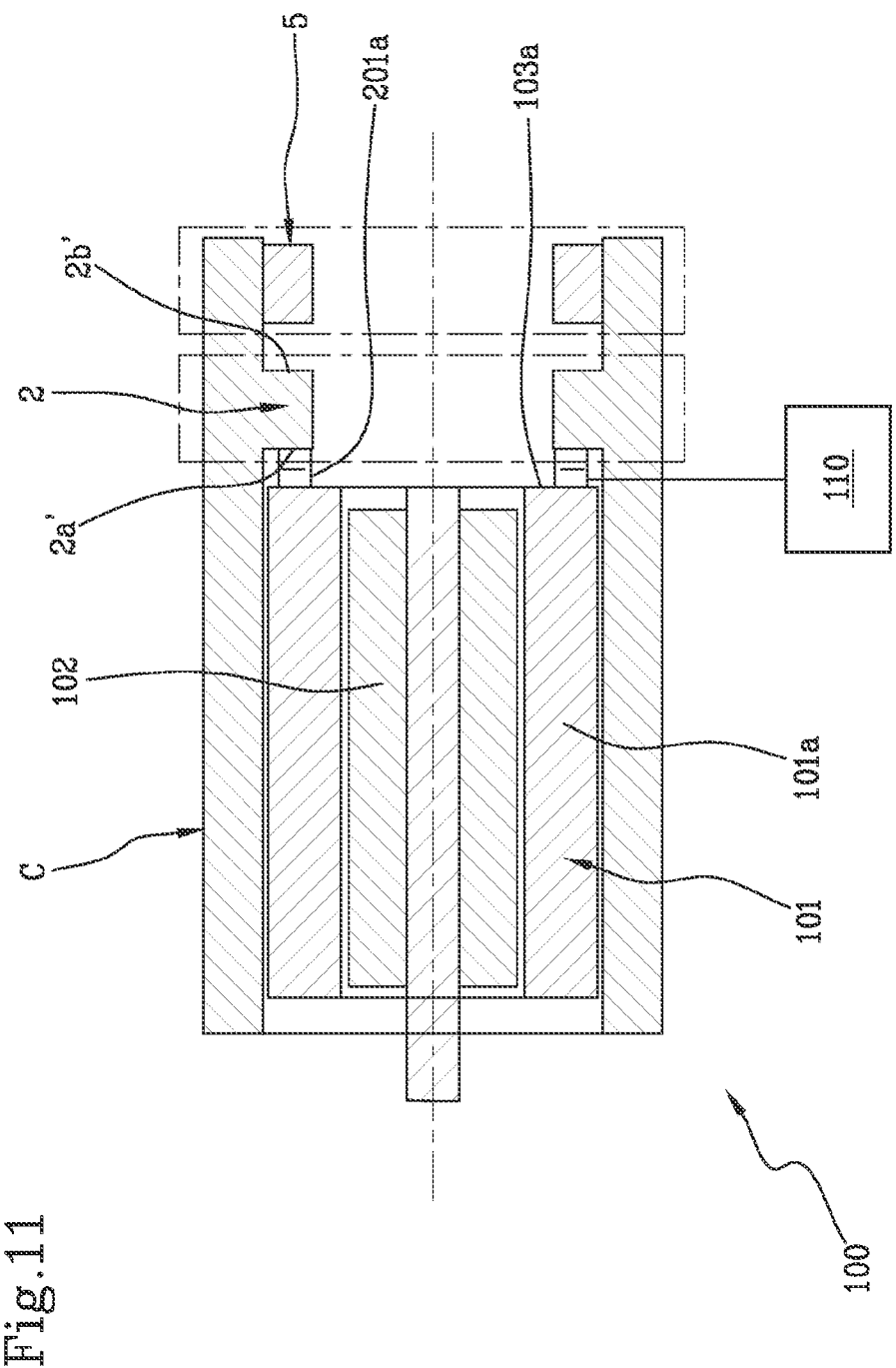

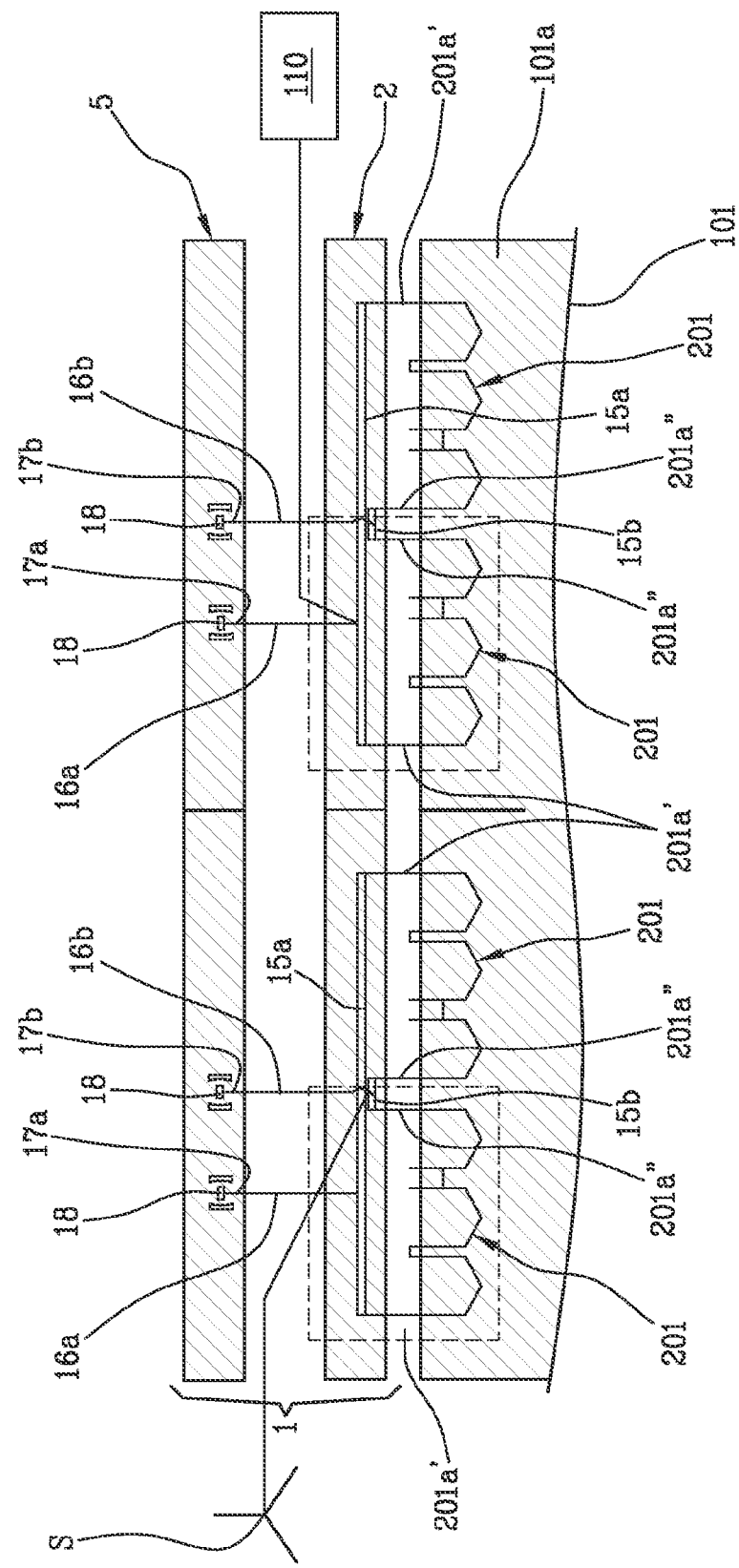

SWITCHING DEVICE FOR AN ELECTRIC MOTOR AND AN ELECTRIC MOTOR COMPRISING SAID SWITCHING DEVICE

This application is the National Phase of International Application PCT/IB2020/052860 filed Mar. 26, 2020 which designated the U.S.

This application claims priority to Italian Patent Application No. 102019000004667 filed Mar. 28, 2019 and Italian Patent Application No. 102019000011655 filed Jul. 12, 2019, which applications are incorporated by reference herein.

This invention relates to a switching device for an electric motor and an electric motor comprising said switching device.

This invention is, therefore, particularly applicable to the automotive sector and, more precisely, to the design and manufacture of electric or electric/endothermic hybrid propulsion vehicles.

In relation to this sector, the desire has long been felt to extend the efficiency range of the electric motor in order to allow its use even in the absence of a mechanical transmission, or, in any case, in the presence of a simplified mechanical transmission.

To date, some methods are known, which are suitable for traction applications and use a suitable subdivision of the stator winding in different sections that can be selectively combined with each other in order to vary the motor "configuration", thus being able to adapt it to the working conditions and extend its working range.

One such solution, perhaps the first, was studied by Eckart Nipp in his 1999 PhD thesis, which described a reconfigurable electric machine capable of achieving good performance in various operating conditions.

This solution, only illustrated on paper, has found limited application on the market, mainly due to its implementation/construction difficulties.

Until today, in fact, E. Nipp's idea has been developed and implemented by equipping motors with complex wiring, relays, and/or solid state devices, the main drawbacks of which include the size, cost and, in the case of solid state devices, in the losses they introduce to the system.

For example, the document WO2018/087689 shows a reconfigurable electrical machine in which the winding of each stator phase is composed of a plurality of coils connected to each other by means of a series of switches that, appropriately controlled, can determine a series or parallel connection between the coils.

Disadvantageously, the presence of numerous switches (at least 6!) to be controlled independently of each other makes the stator structure particularly complex and expensive, as well as not very reliable in light of the multiplicity of non-redundant elements.

Similar considerations may be made for other documents, such as U.S. Pat. No. 8,415,910 and WO2013/155601, that illustrate electrical machines with variable configuration equipped with several switches (at least 3 per phase) thanks to which each phase can change configuration.

The purpose of this invention is, therefore, to provide a switching device for an electric motor that is able to overcome the drawbacks of the prior art described above.

In particular, the purpose of this invention is to provide a switching device for an electric motor that is easy to drive and, at the same time, is smaller in size.

In addition, the purpose of this invention is to provide a switching device for an electric motor that is inexpensive to manufacture and easy to maintain.

Said purposes are achieved by a switching device as well as by an electric motor having the features of one or more of the following claims.

The electric motor comprises at least a first and a second phase extending between corresponding terminals.

Each phase is preferably provided with at least one first phase fraction and at least one second phase fraction, each extending between two ends.

Each terminal preferably corresponds to one end of a first or second phase fraction.

The switching device preferably comprises a fixed body equipped with a plurality of connection portions that can be joined to the ends of the first and second phase fraction and/or the terminals of each phase.

At least one moveable body is also, preferably, provided, which can be moved in relation to the fixed body between at least one first position and a second position.

In the first position, the moveable body arranges the phases in a first electrical configuration.

In the second position, the moveable body arranges the phases in a second electrical configuration.

The second electrical configuration is preferably separate from the first due to the connection between the first and second phase fraction within each phase and/or due to the reciprocal connection between the phases.

In particular, the moveable body comprises a plurality of contact portions that can be joined to the ends of the first and second phase fraction and/or to the terminals of each phase and a plurality of conductive paths operationally placed between the contact portions to electrically connect them.

In addition, a movement unit is preferably provided and configured to move said moveable body between the first and the second position according to the operating conditions of said electric motor.

Advantageously, in this way it is possible to vary the configuration of the electric motor, and, therefore, its "efficiency range", with a simple and unique command that imparts a single movement to a single body (moveable body).

This clearly, significantly simplifies the driving of the system and, moreover, makes it more reliable.

In addition, said at least one moveable body can preferably be moved with respect to the fixed body in a third position, wherein an electric circuit defined by said phases is in an open condition.

It should be noted that, in this respect, the electrical configurations could be varied within a single phase, by varying the connection between the phase fractions, or varied in the connection between the phases.

In this second option, the stator phases do not need to be fractionated, i.e. each phase does not need to comprise several separate phase fractions.

In a preferred embodiment of the invention, the switching device is designed so that:
  in the first position, the moveable body is configured to electrically arrange in series the first and the second phase fraction in each phase, and;
  in the second position, the moveable body is configured to electrically arrange in parallel the first and the second phase fraction in each phase.

According to an additional aspect of the invention, the switching device is designed so that:
  in the first position, the moveable body is configured to connect the phase terminals to each other in a star configuration;

in the second position, the moveable body is configured to connect the phase terminals to each other in a delta configuration.

The switching device shall preferably comprise at least one first and one second of said moveable bodies.

The first moveable body can be moved between the first and the second position to switch the arrangement of the first and the second phase fraction in each phase between a series configuration and a parallel configuration.

The second moveable body can be moved between the first and the second position to switch the reciprocal arrangement of the phases between a star configuration and a delta configuration.

Preferably, therefore, the first and the second moveable body can be reciprocally moved, the one in relation to the other, so as to define a plurality of operating configurations of the electric motor, in particular, at least four.

These operating configurations preferably include at least the following:
- a delta-series configuration, in which the first moveable body is in the first position and the second moveable body is in the second position;
- a delta-parallel configuration, in which both the first moveable body and the second moveable body are in the second position;
- a star-series configuration, in which the first moveable body is in the second position and the second moveable body is in the first position;
- a star-parallel configuration, in which both the first moveable body and the second moveable body are in the first position.

Thus, advantageously, just two commands imparted by or to the movement unit are enough to determine as many as four different electrical configurations of the stator phases, corresponding to four separate application fields able to maximise the efficiency area of the motor.

Said purposes are also achieved by an electric motor, comprising a rotor rotating about its own rotation axis, a stator, and a switching device.

The stator is preferably provided with a prismatic casing extending along said rotation axis between two end faces and containing a plurality of phases extending between respective terminals, wherein each phase is provided with at least one first phase fraction and at least one second phase fraction.

The first and second phase fractions each preferably extend between two ends, wherein each terminal corresponds to one end of a first or second phase fraction.

The switching device shall preferably comprise at least one moveable body and one movement unit.

The moveable body can preferably be moved in relation to the stator between at least one first position, wherein the phases are in a first electrical configuration, and a second position, wherein the phases are in a second electrical configuration.

The movement unit is preferably configured to move said moveable body between the first and the second position according to the operating conditions of said electric motor.

According to one aspect of the invention, complementary or alternative to those listed above, the stator phases comprise a plurality of conductor bundles in series, arranged according to a pre-determined winding scheme and extending each between two free ends.

The switching device preferably comprises a fixed body operationally placed between the stator and the moveable body.

The fixed body is preferably shaped to receive said free ends of the conductor bundles inside in series.

More preferably, the fixed body comprises inside at least one conductive portion shaped to connect in parallel the free ends of two or more conductor bundles and at least one conductive pin departing from said conductive portion and protruding from the fixed body, preferably but not necessarily along an axial direction.

The conductive pin defines an end or terminal of a corresponding phase.

More preferably, the fixed body comprises a plurality of conductive portions shaped to connect different conductor bundles to each other in order to determine a winding scheme consistent with a number of said phases and a plurality of conductive pins joined to each conductive portion and each defining a corresponding end or terminal of a corresponding phase.

These and other characteristics, together with the related technical benefits, will be clearer from the following illustrative, and therefore non-limiting, description of a preferred, and thus non-exclusive, embodiment of a switching device for an electric motor according to what is illustrated in the attached drawings, wherein:

FIGS. 3 and 3a show a front view and a corresponding detail of a possible structural arrangement of the switching device in FIG. 2, in one of its operating configurations;

FIG. 4 shows a front view of a possible structural arrangement of a simplified variant of the switching device in FIG. 3 in one operating configuration thereof;

FIG. 5 shows a front view of the switching device in FIG. 4 in a different operating configuration;

FIGS. 6a and 6b show a front view and an electrical layout of a possible structural arrangement of another simplified variant of the switching device in FIG. 3, in one operating configuration thereof;

FIGS. 7 and 8 show schematic front views of a possible embodiment of the switching device in FIGS. 4 and 5;

FIG. 9 shows a schematic view of a detail in FIG. 8, i.e. a terminal or end of a stator phase engaged in a slot of the moveable body of the switching device, in a preferred embodiment;

FIGS. 10a and 10b show schematic section views of the detail in FIG. 9, in two different assembly configurations;

FIG. 11 shows a schematic section view of an electric motor provided with a switching device according to another embodiment of this invention;

FIG. 12 shows a representative diagram of another embodiment of an electric motor provided with a switching device according to the invention FIG. 13 schematically shows a front view of a possible embodiment for some engine components.

Figure 1:
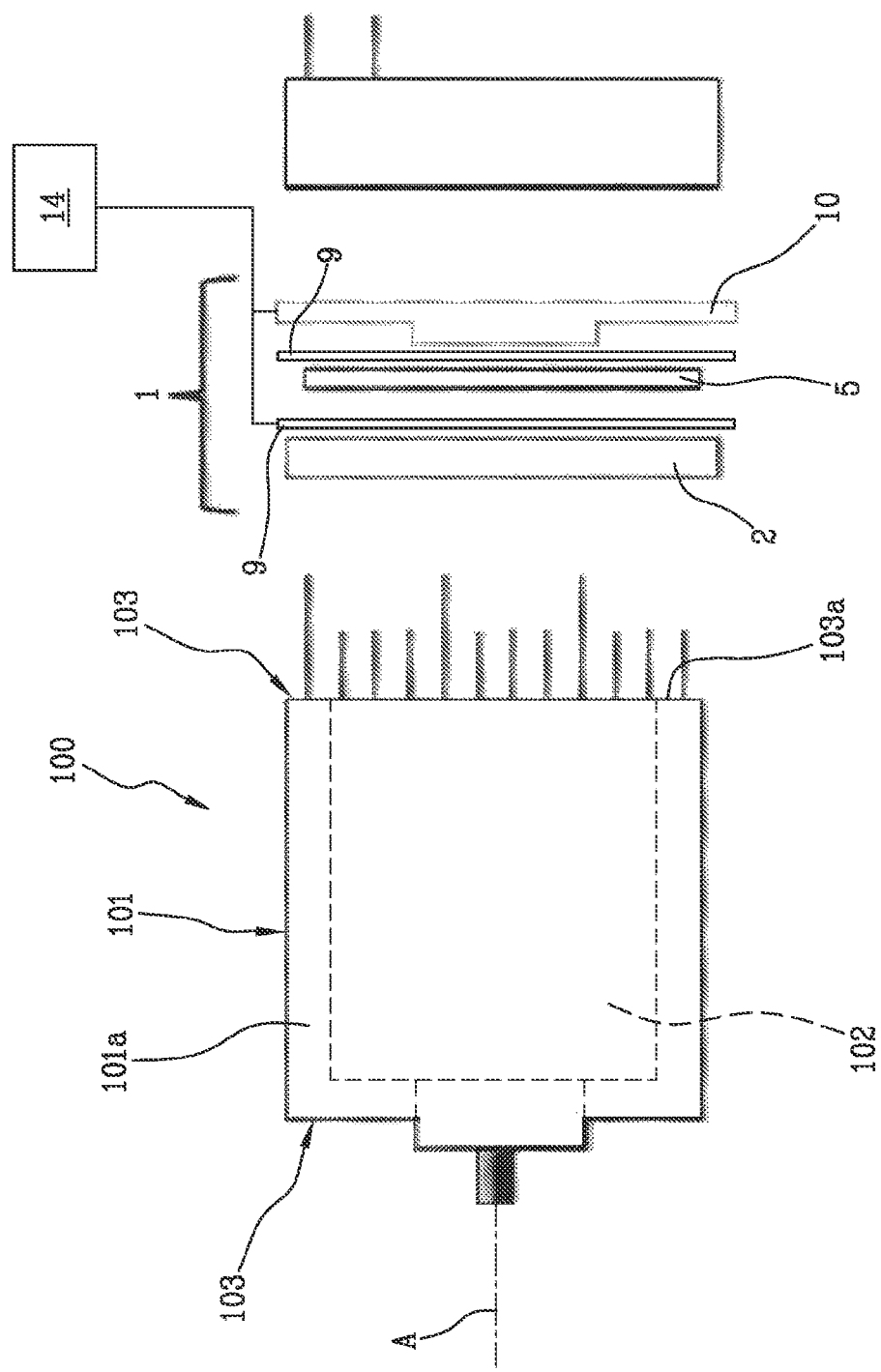
FIG. 1 shows an exploded schematic view of an electric motor provided with a switching device according to this invention.
Figure 2:
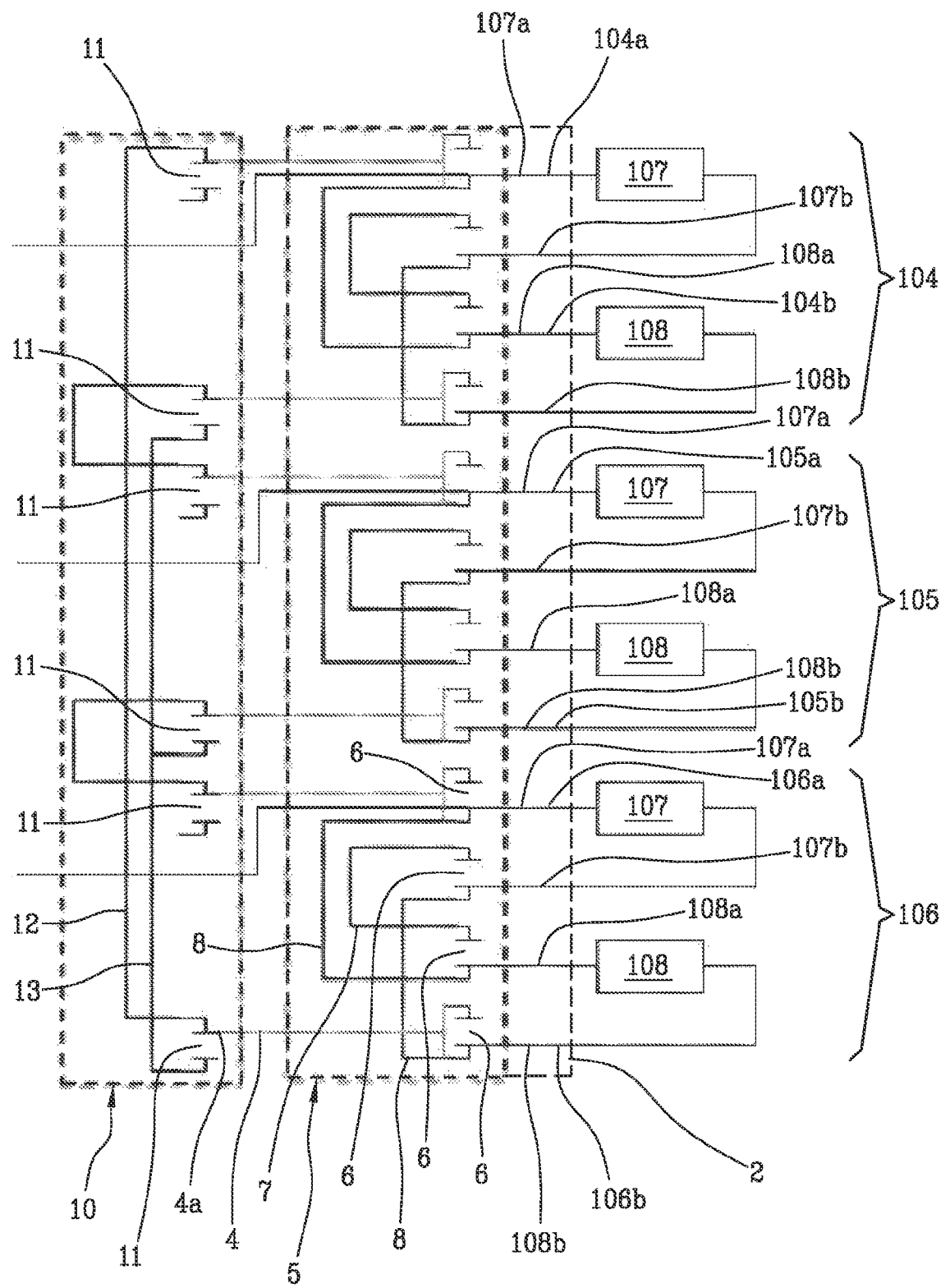
FIG. 2 shows an electrical layout representative of one preferred embodiment of the electric motor and the switching device in FIG. 1.
Figure 3:
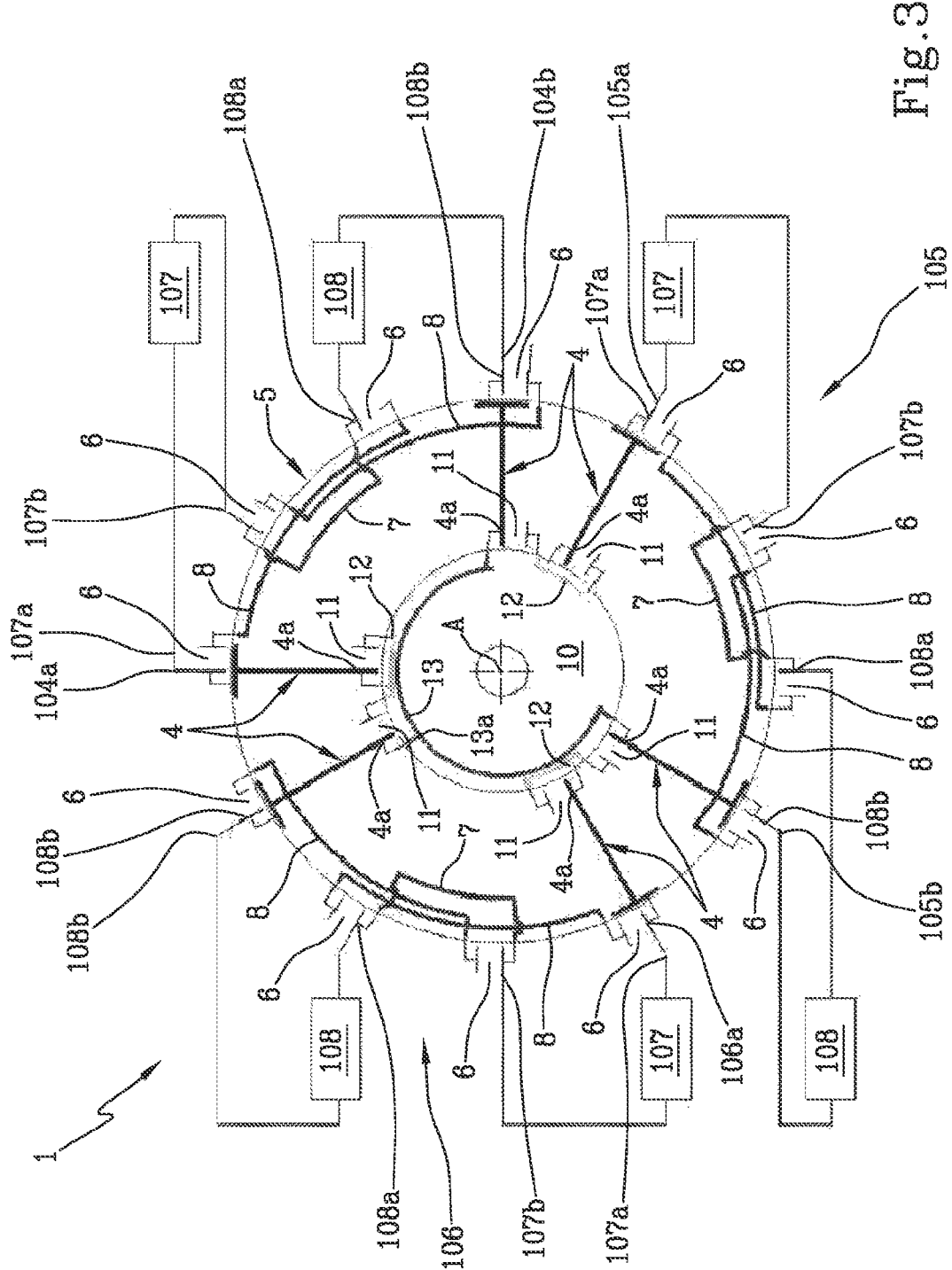

With reference to the appended figures, the reference number 1 indicates a switching device for an electric motor 100 according to this invention.

The switching device 1 is therefore connected, or can be connected, to an electric motor 100, preferably but not exclusively of the internal magnet type.

In particular, the electric motor 100 comprises a stator body, or stator 101, and a rotor body, or rotor 102, which is rotatably joined to the stator 101 to rotate about its own rotation axis "A".

It should be noted that the stator body 101 is preferably housed inside a casing or containment body "C".

The rotor 102 is preferably inserted into the stator 101 coaxially to it, at least to the stator cavity, and comprises a plurality of magnets, electromagnets, or windings designed to generate a magnetic field.

The stator 101, in turn, is provided with a prismatic casing 101*a* extending along said rotation axis "A" between two end faces 103.

This casing 101*a* contains a plurality of phases 104, 105, 106 angularly spaced apart and defined by corresponding windings.

The phases can be of various types, but are preferably defined by bar conductors suitably arranged in corresponding slots formed in the casing and electrically connected to each other at at least one free end (i.e. at an end face 103*a* of the casing 101*a*).

The electric motor 100 is, therefore, of the multiphase type, i.e. comprising a number of phases ranging from two and increasing depending on the type or application.

In the preferred embodiment, however, the electric motor 100 is at least a three-phase motor.

In other words, in the embodiment illustrated (for illustrative purposes only), the stator 101 comprises at least a first 104, a second 105, and a third phase 106.

Each phase 104, 105, 106 extends between corresponding first 104*a*, 105*a*, 106*a* and second terminals 104*b*, 105*b*, 106*b*.

In the embodiment illustrated, the electric motor 100 preferably has fractionated phases.

Preferably, therefore, each phase 104, 105, 106 is provided with at least a first phase fraction 107 and at least a second phase fraction 108, both extending between a first end 107*a*, 108*a* and a second end 107*b*, 108*b*.

It should be noted that, in this respect, one end 107*a* of the first phase fraction 107 and one end 108*b* of the second phase fraction 108 correspond to the terminals 104*a*, 104*b*, 105*a*, 105*b*, 106*a*, 106*b* of the phases 104, 105, 106.

More precisely, the first end 107*a* of the first phase fraction 107 and the second end 108*b* of the second phase fraction 108 correspond, respectively, to the first 104*a*, 105*a*, 106*a* and the second terminal 104*b*, 105*b*, 106*b* of the corresponding first 104, second 105, or third phase 106.

In other words, each terminal 104*a*, 104*b*, 105*a*, 105*b*, 106*a*, 106*b* corresponds to an end 107*a*, 108*b* of a first 107 or second phase fraction 108.

The phase fractions 107, 108 of each phase 104, 105, 106 are like said coils or, preferably, bars (or sets of bars/hairpins) connected to each other.

According to the invention, the phases 104, 105, 106 and/or the phase fractions 107, 108 of each phase can be connected together in a suitable way in order to change the operating configuration of the electric motor 100.

In this regard, a switching device 1 is provided comprising a fixed body 2 equipped with a plurality of connection portions 3 that can be joined to the ends 107*a*, 108*a*, 107*b*, 108*b* of the first 107 and second phase fraction 108 and/or to the terminals 104*a*, 104*b*, 105*a*, 105*b*, 106*a*, 106*b* of each phase 104, 105, 106.

The fixed body 2 is preferably made of aluminium.

In a preferred embodiment, illustrated in FIG. 12, the fixed body 2 is made in the form of a busbar in order to define the electrical connection between the conductor bundles of the winding of the electric motor 100.

More preferably, the stator 101 of the electric motor 100 comprises a multitude of bar conductors suitably coupled to each other so as to define a plurality of conductor bundles 201 connected in series extending between their corresponding free ends 201*a* projecting outside the casing 101*a*.

Each conductor bundle 201 preferably defines an elementary winding that extends between two free ends 201*a* between which a predetermined number of conductors 201 is, thus, arranged.

The elementary windings are, in turn, grouped to define the phase fractions 107, 108 of each phase 104, 105, 106 (or possibly the phases 104, 105, 106).

In particular, each phase fraction 107, 108 (or possibly the phases 104, 105, 106) is defined by a plurality of elementary windings, preferably two elementary windings, connected in parallel to the corresponding ends 107*a*, 108*a*, 107*b*, 108*b*.

In this embodiment, therefore, the free ends 201*a* of the elementary windings, which are disconnected from each other and not yet defining the ends or terminals, axially protrude from the stator body 101.

The fixed body 2 of the switching device 1 is, therefore, operationally placed between the stator 101 and the moveable body 2 and shaped to receive said free ends 201*a* of the elementary windings inside of it.

In the preferred embodiment, the fixed body 2 is axially placed between the stator 101 and the moveable body 5, 10; however, in alternative embodiments the positioning could be reversed or have a different arrangement (radial or other).

Preferably, therefore, in this embodiment the fixed body 2 comprises a plurality of openings (preferably axial) shaped to enable the engagement of each free end 201*a* of the conductor bundles 201.

More preferably, connection portions (soldered or screwed or engaged) are provided between each free end 201*a* of the conductor bundles 201 and a corresponding conductive portion 15*a*, 15*b*.

According to this aspect of the invention, the fixed body 2 therefore comprises, preferably inside thereof, at least one conductive portion 15*a*, 15*b* (or busbar) suitably shaped to connect the free ends 201*a* (in parallel) of two or more elementary windings to each other. The conductor bundles are, therefore, the "sets of bars" described above with reference to the phases or phase fractions, connected together in series according to a suitable winding scheme so as to produce the above-mentioned elementary windings that, once connected in parallel, in turn define the phase fractions 107, 108.

In this respect, the fixed body 2 preferably has at least one conductive pin 16*a*, 16*b* departing from said conductive portion 15*a*, 15*b* (or busbar) and protruding from the fixed body 2. The conductive pins 16*a*, 16*b* preferably axially protrude from the fixed body 2, preferably in a radially more internal position than the position of the conductor bundles 201.

With reference to the preferred embodiment each opening preferably axially departs from each conductive portion 15*a*, 15*b* in the opposite direction to the conductive pin 16*a*, 16*b*, in order to accommodate the free ends 201*a*. In accordance with this aspect, each conductive portion 15*a*, 15*b* therefore extends between the respective free ends 201*a* of the conductor bundles 201 and a corresponding conductive pin 16*a*, 16*b* and is preferably shaped like a plate extending on a plane that is basically perpendicular to the main extension direction of the stator and/or the openings and conductive pins 16*a*, 16*b* (which are, in contrast, preferably parallel to each other).

In particular, each conductive portion has a first end connected to or defining corresponding ends 107*a*, 108*b* of the first 107 or second phase fraction 108 and a second end that is electrically connected to the first end, from which the conductive pin 16a, 16b departs, moving away from the stator.

In other words, the first end can be electrically connected to an already existing end, or it can itself define this end, directly acting as a connecting element between the ends of the elementary windings, so as to electrically connect them in parallel.

The conductive pin 16a, 16b thus defines an electrical connecting element for the corresponding end 107a, 108b.

All the conductive portions 15a, 15b preferably lie on parallel planes; even more preferably, they lie on parallel, coinciding planes.

In other words, in accordance with a preferred embodiment, all the conductive portions 15a, 15b lie on the same plane.

Alternatively, the conductive portions 15, 15b may lie on at least two parallel and separate planes on which the distance between each plane and at least one adjacent plane is, in any case, less than 15 mm.

In accordance with another aspect of this invention, the conductive pins 16a, 16b could have a different orientation, provided they are accessible and can be contacted by the moveable body 5, 10.

This does not detract from the fact that, in this case too, the conductive portions 15a, 15b may be shaped like a plate, possibly bent in such a way as to have a flat extension at least locally perpendicular to the extension direction of the openings and of the conductive pins 16a, 16b. In the preferred embodiment, the fixed body 2 comprises a first conductive portion 15a and a second conductive portion 15b.

Therefore, the fixed body 2 comprises a first conductive pin 16a extending from the first conductive portion 15a to its own free end 17a axially protruding from the fixed body 2.

Similarly, the fixed body 2 comprises a second conductive pin 16b extending from the second conductive portion 15b to its own free end 17b axially protruding from the fixed body 2.

It should be noted that the fixed body 2 preferably comprises a plurality of first and second conductive portions 15a, 15b shaped to connect different conductor bundles 201 to each other in order to determine the winding scheme and the number of phases/phase fractions of the design.

Therefore, each conductive pin 16a, 16b defines a corresponding end 107a, 108a, 107b, 108b or terminal 104a, 104b, 105a, 105b, 106a, 106b of a corresponding phase 104, 105, 106.

It should be noted that the first conductive portion 15a is preferably shaped to connect the first free ends 201a' of said two or more conductor bundles 201 to each other.

The second conductive portion 15b is shaped to connect the second free ends 201a" of said two or more conductor bundles 201 to each other.

The first conductive portion 15a is also preferably placed in connection (or can be connected) with an inverter or drive device 110 of the electric motor 100.

The second conductive portion 15b is, instead, preferably placed in connection (or can be connected) with a star centre "S" of the electric motor 100.

Advantageously, it is not, thus, necessary to connect the individual conductor bundles when winding, but the connection can be easily completed when assembling the switching device 1.

This clearly translates into a considerable advantage in terms of both process and product, as both the number of components and the space required are reduced.

However, in this way the same winding could be used for different machine configurations by simply modifying the structure of the fixed body 2 and the conductive portions 15a, 15b.

In the preferred embodiment, the fixed body 2 is therefore made of electrically insulating material in which the conductive portions 15a, 15b are embedded.

More preferably, the conductive portions 15a, 15b (or busbar) are soldered inside the fixed body 2.

Structurally, the conductive portions 15a, 15b are preferably each defined by a track made of electrically conductive material (preferably copper) partly embedded in an electrically insulating structure of the fixed body 2.

The structure of the fixed body 2 preferably has a plurality of access openings for each conductive portion 15a, 15b designed to enable the connection between each free end 201a of the conductor bundles 201 and the corresponding conductive portion 15a, 15b. Preferably, the fixed body 2 is bound to an end face 103a of the casing 101a.

In the preferred embodiment, the fixed body 2 is defined by a ring or disk abutted against the end face 103a of the casing 101a.

Alternatively, with reference to the embodiment shown in FIG. 11, the fixed body 2 could be made of a single piece (i.e. integrally, for example by moulding or die-casting) with the containment body "C" of the electric motor 100.

More precisely, with reference to this embodiment, the fixed body 2 defines a radially internal shoulder of the containment body "C" provided with at least one first axial face 2a', abutted against the casing 101a of the electric motor 100 and a second axial face 2b' oriented away from the first axial face 2a'.

Advantageously, the number of components during assembly and design is thus reduced by at least one unit.

In addition, the fixed body 2 is thus placed in direct contact with the body "C" to which it can then release heat by conduction during the normal use of the electric motor 100.

Advantageously, the heat transferred in this way can then be dissipated by means of a suitable cooling circuit of the electric motor 10 housed inside the body "C", without requiring the onerous and cumbersome installation of a dedicated cooling device for the switching device.

The connection portions 3 are defined by seats where the free ends of the phase fractions 107, 108, which, as mentioned above, are preferably in the form of a bar (hairpin), are engaged.

It should be noted that, preferably, the connection portions 3 of the fixed body 2 correspond, in number, to the number of ends of the phase fractions 107, 108.

In other words, in fractionated phase embodiments, the number of connection portions 3 of the fixed body 2 is preferably equal to twice the number of phases multiplied by the number of "fractions" (i.e. phase fractions) of each phase. In the illustrated embodiment, for example, the number of connection portions 3 is 12.

In non-fractionated phase embodiments, on the contrary, the number of connection portions 3 of the fixed body 2 could be limited to the number of phase terminals (i.e. twice the number of phases).

In addition, the fixed body 2 preferably comprises at least one connecting jumper 4 connected to each first 104a, 105a, 106a or second terminal 104b, 105b, 106b and extending from the corresponding terminal 104a, 104b, 105a, 105b, 106a, 106b at one free end 4a.

In other words, as will be better clarified below, a connecting jumper 4 is joined to each terminal 104a, 104b, 105a, 105b, 106a, 106b of a phase 104, 105, 106, each jumper defining an additional contact zone with said terminal 104a, 104b, 105a, 105b, 106a, 106b at its free end 4a.

According to the invention, the switching device 1 comprises at least one moveable body 5, 10 that can be moved in relation to the fixed body 2.

The moveable body 5, 10 can preferably be selectively moved in relation to the fixed body 2 between at least one first and one second position.

In the first position, the moveable body 5, 10 arranges the phases 104, 105, 106 in a first electrical configuration.

In the second position, the moveable body 5, 10 preferably arranges the phases in a second electrical configuration.

The second electrical configuration is separate from the first one due to the connection between the first 107 and the second phase fraction 108 within each phase 104, 105, 106 and/or due to the reciprocal connection between the phases 104, 105, 106.

In other words, the movement of the moveable body 5, 10 in relation to the fixed body 2 ensures that the electrical configuration of the electric motor 1 is modified by at least one first to at least one second configuration.

In this regard, a movement unit 9 is also provided that is configured to move said moveable body 5, 10 between the first and the second position according to the operating conditions of said electric motor 1.

The movement unit 9 can be of various types, either separate from the bodies 2, 5, 10 or partly or totally integrated with them (e.g. magnets/electromagnets).

Moreover, said at least one moveable body 5, 10 can preferably also be moved into a third position in relation to the fixed body 2.

In the third position (separate from the first and second) an electrical circuit defined by said phases 104, 105, 106 is in an open condition.

In other words, the third position is a neutral position wherein the stator phases are in a non-conductive state.

Advantageously, this makes it possible to run the motor in idle, for example, keeping the rotor firmly bound to the vehicle's wheel assembly without the need to introduce a clutch or disconnect clutch to operate when the electric motor is not operating.

It should be noted that the moveable body 5, 10 can preferably be moved along a stroke that goes from the first to the second position, in which said third position is intermediate between said first and said second position.

Preferably, the moveable body 5, 10 has a plurality of contact portions 6, 11 each joined to a corresponding end 107a, 108a, 107b, 108b or a corresponding terminal 104a, 104b, 105a, 105b, 106a, 106b of the phase 104, 105, 106.

Each contact portion 6, 11 comprises at least one first 6a, 11a and one second connecting point 6b, 11b separate and positioned so that the first point 6a, 11a contacts the corresponding end or terminal in the first position and the second point 6b, 11b contacts the corresponding end or terminal in the second position of the moveable body 5, 10.

Figure 8:
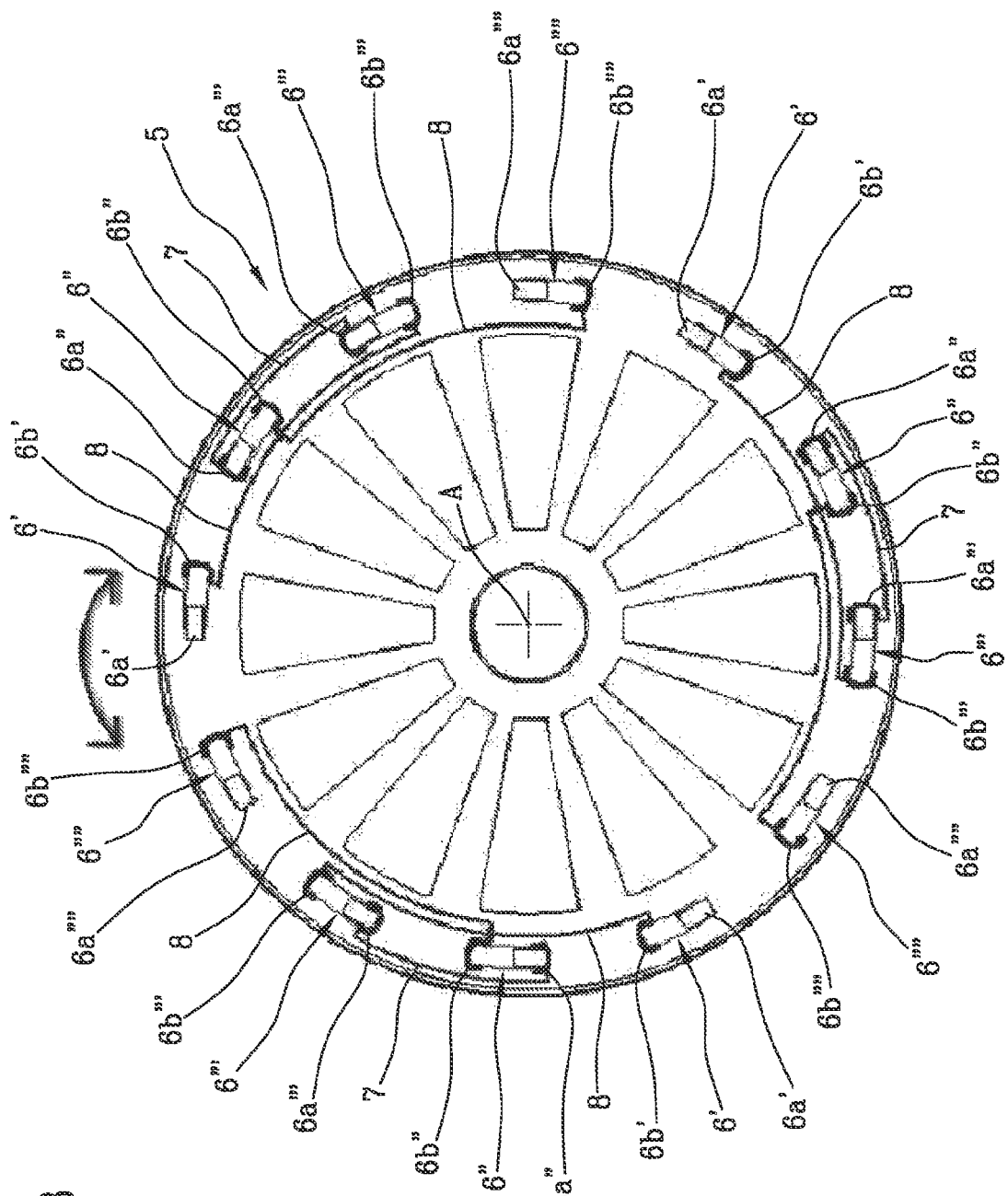
Figure 13:
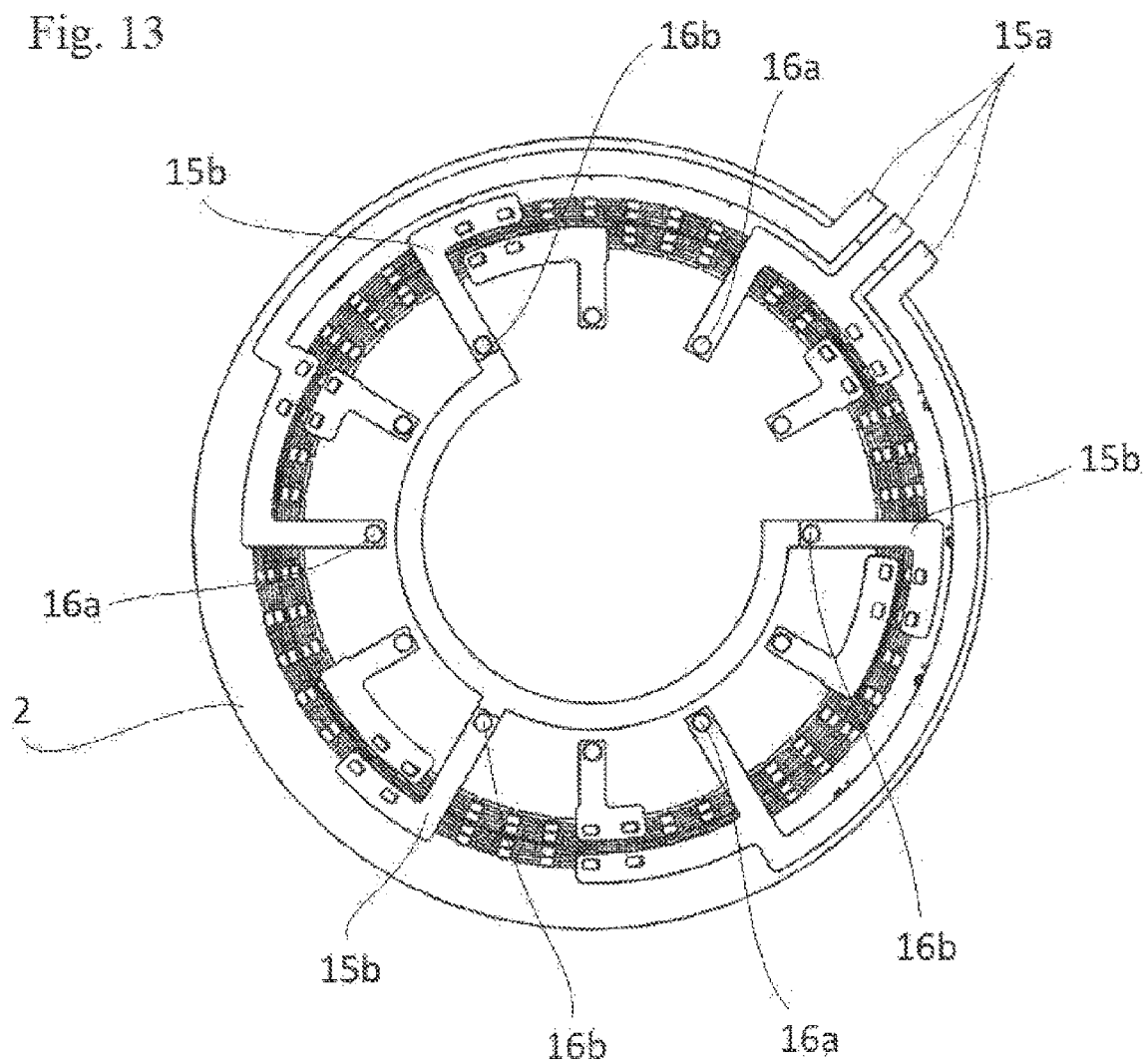

As illustrated, for example, in FIGS. 8 to 10a, 10b, the contact portions 6, 11 are preferably shaped like slots oriented along a movement direction of the moveable body 5, 10, in which the ends 107a, 108a, 107b, 108b of the phase fractions 107, 108 are at least partially housed.

The third position is preferably defined in an intermediate position of the slot, spaced both from the first 6a, 11a and from the second point 6b, 11b.

It should be noted that, in order to increase the reliability of the electrical machine and to make its maintenance easier, each end 107a, 108a, 107b, 108b or corresponding terminal 104a, 104b, 105a, 105b, 106a, 106b of the phase 104, 105, 106 is connected to a removeable reinforcement element 18.

For example, in the embodiment illustrated in FIGS. 9, 10a, 10b the removeable reinforcement element 18 comprises a thick body that is detachably fixed to a corresponding end 107a, 108a, 107b, 108b or to a corresponding terminal 104a, 104b, 105a, 105b, 106a, 106b.

This reinforcement element 18 is housed in the slot 6, 11 so that it can be engaged by the contact portions.

In the preferred embodiment, the reinforcement element 18 is defined by a cap screwed to the free end of the corresponding end 107a, 108a, 107b, 108b or terminal 104a, 104b, 105a, 105b, 106a, 106b.

More preferably, with reference to the embodiments illustrated in FIGS. 10a and 12, the reinforcement element 18 is defined by a cap screwed to the free end 17a, 17b of a corresponding conductive pin 16a, 16b.

Alternatively, the reinforcement element 18 could be coupled to the free end of the corresponding end 107a, 108a, 107b, 108b or terminal 104a, 104b, 105a, 105b, 106a, 106b by other types of reversible coupling, such as, for example, a fast coupling, bayonet, or similar.

In terms of material, the reinforcement element 18 is made of electrically conductive material, preferably copper.

It should be noted that the switching device 1 preferably comprises a first 5 and/or a second moveable body 10.

In other words, in the preferred embodiment, the switching device 1 comprises at least two moveable bodies, a first moveable body 5, and a second moveable body 10 respectively.

Alternatively, however, the switching device 1 could also comprise just the first 5 or the second moveable body 10, the operations of which are complementary but independent of each other (as will be further explained below).

For descriptive simplicity, but without any loss of generality thereby, in the following we will also use the definitions "first moveable body" and "second moveable body" in describing embodiments wherein only one of the two moveable bodies is present.

The first moveable body 5 is preferably shaped to enable, with the movement between the first and the second position, the variation in the electrical connection between the phase fractions 107, 108 of each phase 104, 105, 106.

In particular, in the first position, the moveable body 5 is configured to electrically arrange in series the first 107 and the second phase fraction 108 in each phase 104, 105, 106.

In the second position, the moveable body 5 is configured to electrically arrange in parallel the first 107 and the second phase fraction 108 in each phase 104, 105, 106.

In other words, the first moveable body 5 has contact portions 6 electrically connected to each other so that in the first position a series connection is established between the ends 107a, 108a, 107b, 108b of the phase fractions 107, 108 and in the second position a parallel connection is established between the same ends 107a, 108a, 107b, 108b.

Preferably, the first moveable body 5 can also be positioned in the third position, neutral, wherein the phase fractions 107, 108 of each phase are disconnected from each other.

In particular, the first moveable body 5 comprises a plurality of conductive paths 7, 8 operationally placed between the contact portions 6 corresponding to each single phase 104, 105, 106.

The conductive paths 7, 8 are arranged so as to connect in different ways the contact portions 6 in the first points 6a compared to the second points 6b.

For example, with reference to the first phase 104, the first moveable body 5 comprises at least one first 6', one second 6", one third 6'" and one fourth 6"" contact portion, each joined to a corresponding end 107a, 108a, 107b, 108b of a phase fraction 107, 108.

In particular, the first 6', second 6", third 6'", and fourth 6"" contact portion are respectively joined to the first 107a and second 107b ends of the first phase fraction 107 and the first 108a and second end 108b of the second phase fraction 108 of the first phase 104.

The first contact portion 6' is joined to the first end 107a of the first phase fraction 107, which performs the role of first terminal 104a of the first phase 104.

The fourth contact portion 6"" is joined to the second end 108b of the second phase fraction 108, which performs the role of the second terminal 104b of the first phase 104.

The conductive paths comprise a first conductive path 7 that extends between the first point 6a" of the second contact portion 6" and the first point 6a'" of the third contact portion 6'".

In addition, there are at least two second conductive paths 8 extending respectively:
- between the second point 6b" of the second contact portion 6" and the second point 6b'" of the fourth contact portion 6'", and
- between the second point 6b' of the first contact portion 6' and the second point 6b'" of the third contact portion 6'".

In this way, in the first position the second end 107b of the first phase fraction 107 and the first end 108a of the second phase fraction 108 are electrically connected to each other in series between said phase fractions 107, 108.

In contrast, in the second position the first ends 107a, 108a and the second ends 107b, 108b of the phase fractions 107, 108 are electrically connected to each other in parallel between said phase fractions 107, 108.

Similar considerations can be made, mutatis mutandis, for all the other stator phases (second 105 and third 106), wherein the arrangement of the contact portions 6 and the conductive paths 7, 8 is similar and/or specular.

Advantageously, therefore, with a simple, single movement of the first moveable body 5 it is possible to completely reconfigure the phases, which, by passing from series to parallel (and vice versa), increase the efficiency range and the speed range of the electric motor 1.

The first moveable body 5 is preferably rotatably joined to the fixed body 2 in order to rotate in relation to it between the first and second position.

More precisely, the first moveable body 5 can be rotated about its own central axis between a first angular position and a second angular position corresponding to said first and second position The movement unit 9, therefore, comprises a rotary actuator joined to the first moveable body 5.

The first moveable body 5 is preferably at least partly defined by a disk or ring coaxial to the fixed body 2 and abutted against or facing it.

With reference to the embodiment in FIG. 11, the first moveable body 5 is abutted against or facing the second axial face 2b' of the radially internal shoulder defining the fixed body 2.

The contact portions 6 are, therefore, preferably defined by circular segment-shaped slots extending between the first 6a and the second point 6b.

The rotary movement of the first moveable body 5 advantageously reduces the necessary dimensions and facilitates the implementation of the movement.

In the preferred embodiment, the first body 5 is made in the form of a busbar connection and, more preferably, is made of aluminium (possibly embedded in a plastic moulding).

The second moveable body 10 can preferably also be moved between at least one corresponding first position and one corresponding second position.

The movement unit 9 (which may be the same as described above or a different one) should, therefore, be configured to move said second moveable body 10 in relation to the first 2 between the first and the second position depending on the operating conditions of said electric motor 1.

In the first position, the moveable body 10 connects the terminals 104a, 104b, 105a, 105b, 106a, 106b of the phases 104, 105, 106 together in a star configuration.

In the second position, in contrast, the second moveable body 10 connects the terminals 104a, 104b, 105a, 105b, 106a, 106b of the phases 104, 105, 106 together in a delta configuration.

Thus, the range of use of the electric motor is, advantageously, even wider, the motor being able to provide high-efficiency performance in a wider field of use.

It should be remembered that, in certain embodiments (FIGS. 6a, 6b), the switching device 1 could comprise only the second moveable body 10, in the absence of the first 5.

These embodiments, however included in the spirit of the invention, would allow a switching of just one connection between the phases 104, 105, 106 without, however, enabling the performance of the single phase to be remodelled.

In this regard, it should be noted that the embodiments provided with only the second moveable body 10 can be used both in motors wherein the stator phases are fractionated and in motors wherein the stator phases are not fractionated.

The second moveable body 10 preferably comprises a plurality of corresponding contact portions 11 (described above) and a plurality of corresponding conductive tracks 12, 13 operationally placed between the terminals 104a, 104b, 105a, 102b, 106a, 106b of the phases 104, 105, 106.

The conductive paths 12, 13 of the second moveable body 10 are arranged so as to connect in different ways the contact portions 11 in the first points 11a compared to the second points 11b.

In particular, the second moveable body 10 comprises at least a first 11' and one second 11" contact portion joined, respectively, to each first 104a, 105a, 106a and second terminal 104b, 105b, 106b.

The conductive paths 12, 13 of the second moveable body 10, in contrast, comprise at least a plurality of first paths 12 that connect a second contact portion 11" with a first contact portion 11', and a plurality of second paths 13 that connect the first contact portions 11' together.

More precisely, each first path 12 extends between the second point 11b" of a second contact portion 11" and the second point 11b' of a first contact portion 11' joined to the adjacent phase.

Each second path 13, instead, extends between a first point 11a" of a second contact portion 11" and a point of intersection 13a wherein all the second paths 13 (electrically connected, in any case, to the first points 11a' of the other first contact portions 11') converge.

Advantageously, therefore, the second moveable body 10 also enables the switching of the electrical configuration of the motor with a single, simple movement of a single element.

In this regard, the second moveable body 10 is preferably rotatably joined to the fixed body 2 so as to rotate with respect to it between the first and the second position.

More precisely, the second moveable body 10 can rotate about its own central axis between a first angular position and a second angular position corresponding to said first and second position.

The second moveable body 10 is also preferably shaped like a disc or ring and is positioned coaxially to the fixed body 2.

In the preferred embodiment, therefore, the fixed body 2, the first moveable body 5, and the second moveable body 10 are coaxial to each other and arranged in succession along a common axis, preferably corresponding to the rotation axis "A" of the rotor 102.

In this regard, it should be noted that the contact portions 11 of the second moveable body 10 are each joined or coupled to the free end 4a of the connecting jumper 4 joined to the corresponding terminal 104a, 104b, 105a, 105b, 106a, 106b.

Advantageously, in this way, it is possible to move the contact portions 6, 11 of the first 5 and the second moveable body 10 radially or axially away, facilitating their simultaneous presence.

In the preferred embodiment, the connecting jumpers 4 extend radially from a radially external portion, connected to the terminals 104a, 104b, 105a, 105b, 106a, 106b, to a radially internal portion, containing the free end 4a.

Advantageously, in this way, it is possible to keep the structure of the switching device compact, as the "operating zone" of the two moveable bodies (first 5 and second 10) is staggered axially and radially.

It should be noted that the first 5 and the second moveable body 10 are moveable independently and reciprocally in relation to each other.

In this way, the switching device 1 enables a plurality of operating configurations to be defined; this plurality is equal to the product of the number of positions that can be assumed by the first 5 and the second moveable body 10.

With reference to the preferred embodiment, the switching device 1 makes it possible to obtain one or more of the following operating configurations:
 a delta-series configuration, in which the first moveable body 5 is in the first position and the second moveable body 10 is in the second position;
 a delta-parallel configuration, in which both the first moveable body 5 and the second moveable body 10 are in the second position;
 a star-series configuration, in which the first moveable body 5 is in the second position and the second moveable body 10 is in the first position;
 a star-parallel configuration, in which both the first moveable body 5 and the second moveable body 10 are in the first position.

Advantageously, each of these configurations has peculiarities both in terms of deliverable torque and speed achievable, making the motor performance easily adaptable to the operating conditions of the same and, in terms of vehicles, to the conditions in which the vehicle is used.

For example, in the starting phase it may be advantageous to drive the switching device to position it in delta-series or star-series configurations, which make it possible to obtain high torques at low rotation speeds, while in cruise phase it could be advantageous to drive the switching device to position it in delta-parallel or star-parallel configurations, which make it possible to reach high rotation speeds.

In this respect, the switching system 1 comprises a control unit 14 joined to the movement unit(s) 9 in order to drive them according to the operating conditions of the electric motor 100.

This control unit 14 is preferably joined to the vehicle's control unit or sensor means capable of transmitting information related to the operating parameters of the vehicle and/or the electric motor 100 itself.

The invention achieves its purposes and significant advantages are thus obtained.

In fact, the presence of a switching device able to change the electrical configuration of the motor with a simple movement of a single rigid element that can be suitably driven, greatly increases the reliability of the system while simplifying it and reducing the costs thereof, both in terms of production and maintenance.

Moreover, the control and driving of this device is also greatly simplified, making the electric motor to which it is joined more efficient, which can change configuration more quickly and in a greater number of circumstances.

The invention claimed is:

1. A switching device for an electric motor, said motor comprising a plurality of phases extending between respective terminals and each including a first phase fraction and a second phase fraction each extending between two ends, where each terminal corresponds to one end of the first or second phase fraction; said switching device comprising:
 a fixed body including a plurality of connection portions that are connectable to the ends of the first and second phase fraction and/or the terminals of the phases;
 at least one moveable body movable with respect to the fixed body between at least:
  a first position, in which the phases are arranged in a first electrical configuration;
  a second position, in which the phases are arranged in a second electrical configuration, separate from the first electrical configuration due to a connection between the first and the second phase fraction within each phase and/or due to a reciprocal connection between the phases;
 a movement unit configured to move said at least one moveable body between the first and the second position according to operating conditions of said electric motor;
 said at least one moveable body comprising a plurality of contact portions each of which is connectable to a corresponding end of said first and second phase fraction or to a respective terminal of the phases and a plurality of conductive paths operationally placed between said contact portions,
 wherein said at least one moveable body is made as a busbar to define the respective connection and/or reciprocal connection.

2. The switching device according to claim 1, wherein:
 in said first position, the at least one moveable body is configured to electrically arrange in series the first and the second phase fraction in each phase, and
 in said second position, the at least one moveable body is configured to electrically arrange in parallel the first and the second phase fraction in each phase.

3. The switching device according to claim 1, wherein:
 in said first position, the at least one moveable body is configured to connect the terminals of the phases to one another according to a star configuration;
 in said second position, the at least one moveable body is configured to connect the terminals of the phases to one another according to a delta configuration.

4. The switching device according to claim 1, wherein said at least one moveable body is movable with respect to the fixed body to a third position, in which an electrical circuit defined by said phases is in an open condition.

5. The switching device according to claim 1, wherein said moveable body is rotatably mounted with respect to the fixed body so as to be rotatable with respect to the fixed body between the first and the second position.

6. The switching device according to claim 5, wherein said fixed body and said at least one moveable body are coaxial to and abutted against one another; said at least one moveable body being rotatable about a central axis thereof between a first angular position and a second angular position corresponding respectively to said first position and said second position.

7. The switching device according to claim 1, wherein said fixed body and said at least one moveable body are defined by coaxial and aligned metal rings.

8. The switching device according to claim 1, wherein said at least one movable body comprises a first moveable body and a second moveable body, in which:
the first moveable body is movable between the first position and the second position to switch the arrangement of the first and the second phase fraction, in each phase, between a series configuration and a parallel configuration;
the second moveable body is moveable between the first position and the second position to switch the reciprocal arrangement of the phases between a star configuration and a delta configuration.

9. The switching device according to claim 8, wherein the fixed body comprises at least one connecting jumper connected to each terminal and extending from the respective terminal to one of the free ends; said second moveable body being connected to the fixed body at said free ends of the connecting jumpers.

10. The switching device according to claim 8, wherein said first moveable body and second moveable body are reciprocally moveable to define at least the following operating configurations of the electric motor:
a delta-series configuration, in which the first moveable body is in the first position and the second moveable body is in the second position;
a delta-parallel configuration, in which both the first moveable body and the second moveable body are in the second position;
a star-series configuration, in which the first moveable body is in the second position and the second moveable body is in the first position;
a star-parallel configuration, in which both the first moveable body and the second moveable body are in the first position.

11. An electric motor, comprising:
the switching device according to claim 1;
a rotor rotatable about a first rotation axis;
a stator provided with a prismatic casing extending along said rotation axis between two end faces and containing a plurality of phases extending between respective ones of the terminals, in which each phase includes at least the first phase fraction and at least the second phase fraction; said first and second phase fractions each extending between two ends, in which each of the terminals corresponds to one end of the first or the second phase fraction;
wherein the fixed body of the switching device is abutted against and fixed to one of said end faces of the casing.

12. The motor according to claim 11, wherein the stator comprises a plurality of housing openings and a corresponding plurality of series conductor groups housed in said openings, said series conductor groups being arranged according to a prefixed winding scheme and each series conductor groups extending between two free ends, wherein the fixed body is shaped to receive internally said free ends of each of the series conductor groups; said fixed body comprising internally:
at least one conductive portion shaped to connect together in parallel the free ends of two or more of the series conductor groups,
a conductive pin departing from said at least one conductive portion and protruding from the fixed body; said conductive pin defining an end or terminal of a corresponding phase.

13. The motor according to claim 12, wherein the at least one conductive portion is shaped as a plate, extending on a plane perpendicular to an extension direction of the openings and of the conductive pin.

14. The electric motor according to claim 12, wherein the fixed body comprises:
a plurality of conductive portions shaped to connect different series conductor groups together to determine a winding scheme consistent with a number of said phases;
a plurality of conductive pins joined to each conductive portion and each defining a corresponding end or terminal of a corresponding phase.

15. The electric motor according to claim 12, wherein the fixed body comprises a first conductive portion and a second conductive portion from which a first conductive pin and a second conductive pin respectively depart.

16. An electric motor, comprising:
a plurality of phases extending between respective terminals and each including a first phase fraction and a second phase fraction each extending between two ends, where each terminal corresponds to one end of the first or second phase fraction;
a switching device comprising:
a fixed body including a plurality of connection portions that are connectable to the ends of the first and second phase fraction and/or the terminals of the phases;
at least one moveable body movable with respect to the fixed body between at least:
a first position, in which the phases are arranged in a first electrical configuration;
a second position, in which the phases are arranged in a second electrical configuration, separate from the first electrical configuration due to a connection between the first and the second phase fraction within each phase and/or due to a reciprocal connection between the phases;
a movement unit configured to move said at least one moveable body between the first and the second position according to operating conditions of said electric motor;
said at least one moveable body comprising a plurality of contact portions each of which is connectable to a corresponding end of said first and second phase fraction or to a respective terminal of the phases and a plurality of conductive paths operationally placed between said contact portions,
a rotor rotatable about a first rotation axis;
a stator provided with a prismatic casing extending along said rotation axis between two end faces and containing a plurality of phases extending between respective ones of the terminals, in which each phase includes at least the first phase fraction and at least the second phase fraction; said first and second phase fractions each extending between two ends, in which each of the terminals corresponds to one end of the first or the second phase fraction;

wherein the fixed body of the switching device is abutted against and fixed to one of said end faces of the casing;

wherein the stator comprises a plurality of housing openings and a corresponding plurality of series conductor groups housed in said openings, said series conductor groups being arranged according to a prefixed winding scheme and each series conductor groups extending between two free ends, wherein the fixed body is shaped to receive internally said free ends of each of the series conductor groups; said fixed body comprising internally:
- at least one conductive portion shaped to connect together in parallel the free ends of two or more of the series conductor groups,
- a conductive pin departing from said at least one conductive portion and protruding from the fixed body; said conductive pin defining an end or terminal of a corresponding phase;

wherein the at least one conductive portion is shaped as a plate extending on a plane perpendicular to an extension direction of the openings and of the conductive pin.

* * * * *